(12) United States Patent
Maile

(10) Patent No.: US 9,089,147 B2
(45) Date of Patent: Jul. 28, 2015

(54) DEVICE AND METHOD FOR LOADING A FOOD PROCESSING MACHINE, IN PARTICULAR A FILLING MACHINE OR A CUTTER, WITH FOOD

(75) Inventor: Bernd Maile, Oggelshausen (DE)

(73) Assignee: ALBERT HANDTMANN MASCHINENFABRIK GMBH & CO, Biberach (DE)

( * ) Notice: Subject to any disclaimer, the term of this patent is extended or adjusted under 35 U.S.C. 154(b) by 856 days.

(21) Appl. No.: 13/357,761

(22) Filed: Jan. 25, 2012

(65) Prior Publication Data

US 2012/0207566 A1    Aug. 16, 2012

(30) Foreign Application Priority Data

Feb. 16, 2011    (EP) ..................................... 11154685

(51) Int. Cl.
| B67C 3/26 | (2006.01) |
| A22C 11/02 | (2006.01) |
| B65G 65/23 | (2006.01) |
| G01G 13/02 | (2006.01) |
| G01G 13/22 | (2006.01) |

(52) U.S. Cl.
CPC ................ *A22C 11/02* (2013.01); *B65G 65/23* (2013.01); *G01G 13/024* (2013.01); *G01G 13/22* (2013.01)

(58) Field of Classification Search
CPC ........ A22C 18/00; A22C 11/02; G01G 13/02; G01G 13/022; G01G 13/024; G01G 13/22

USPC ............... 141/266, 284, 363, 365, 83; 452/31
See application file for complete search history.

(56) References Cited

U.S. PATENT DOCUMENTS

| 4,574,849 A | * | 3/1986 | Fukuda ............................. 141/1 |
| 5,810,117 A | * | 9/1998 | Wood ............................ 187/244 |
| 5,941,921 A | * | 8/1999 | Dasys et al. .................... 701/50 |
| 7,024,988 B2 | * | 4/2006 | Corominas ..................... 99/532 |
| 8,146,624 B2 | * | 4/2012 | Ghiraldi ........................ 141/83 |
| 2005/0220580 A1 | | 10/2005 | Arnold et al. |
| 2009/0130962 A1 | * | 5/2009 | Willburger et al. ............. 452/31 |

FOREIGN PATENT DOCUMENTS

| DE | 2421837 A1 | 2/1976 |
| EP | 1 040 758 A1 | 10/2000 |
| EP | 1402782 A1 | 3/2004 |
| EP | 2062478 A1 | 5/2009 |

OTHER PUBLICATIONS

European Search Report for 11154685.9 dated Sep. 6, 2011.

* cited by examiner

*Primary Examiner* — Jason K Niesz
(74) *Attorney, Agent, or Firm* — Marshall, Gerstein & Borun LLP

(57) ABSTRACT

A device and a method for loading a food processing machine, in particular a filling machine or a cutter, with food, including a container for receiving the food, a lifting means by which the container can be driven upwards, a drive for the lifting means, and a measuring means for detecting the amount of food in the container.

32 Claims, 4 Drawing Sheets

DEVICE AND METHOD FOR LOADING A FOOD PROCESSING MACHINE, IN PARTICULAR A FILLING MACHINE OR A CUTTER, WITH FOOD

CROSS-REFERENCE TO RELATED APPLICATION

The present application claims the benefit of priority of European Application No. 11154685.9, filed Feb. 16, 2011. The entire text of the priority application is incorporated herein by reference in its entirety.

FIELD OF THE DISCLOSURE

The disclosure relates to a device and to a method for loading a food processing machine, in particular a filling machine or a cutter.

BACKGROUND

In the food industry, lifting means are employed for loading food processing machines, for example vacuum filling machines or cutters. These lifting means are usually realized as arm lifting means or else as pole lifting means and can be attached to a machine, for example a vacuum filling machine or a cutter, or else be designed as an independent unit ("stand-alone unit"). These lifting means are designed for receiving partially standardized containers, for example mobile sausage meat trolleys (i.e. provided with rollers). In the process, the sausage meat trolley is typically transferred into the receiving unit of the lifting means such that it is securely locked against falling out and transferred by means of the lifting means, for example, upwards over the feed hopper of a vacuum filling machine. There, the sausage meat trolley is then emptied into the feed hopper. Subsequently, the sausage meat trolley is returned to its original position by means of the lifting means and removed again by the operator by releasing the locking at the lifting means. In the loading of cutters, the cutter bowl is correspondingly loaded.

The upward movement of the arm lifting means can here be designed to be superposed with the tipping movement. The upward movement of the lifting means and thus the movement of the sausage meat trolley is here effected, just as the downward movement, at a nearly constant lifting or lowering speed, apart from unintentionally acting influencing factors (e.g. vibrations).

In most cases, the lifting means comprise a hydraulic drive. In this case, the drive (i.e. for example the hydraulic pump) is operated at such high power that a maximally required lifting force (e.g. >3000 N) is provided which is greater than the maximum load corresponding to a maximum filling or a maximally admissible load (e.g. 3000 N). Even if the sausage meat trolley is only half filled, this force is provided, and the drive runs at a correspondingly high power.

For safety reasons, there is a demand on the food machines to control the downward movement of the sausage meat trolley, among other things to prevent a person located under the sausage meat trolley that moves downwards from being injured by an automatic and thus possibly uncontrolled downward movement. This safety requirement is realized in practice by a so-called "dead man's control" where the operator must continuously press a button during the lowering of the sausage meat trolley from its horizontal position on; otherwise the downward movement is stopped immediately.

The known lifting means, however, involves essential disadvantages. For example, the operator must continuously press a button during the downward movement from the horizontal line on and thus he cannot work productively. Moreover, before tipping the next sausage meat trolley into the vacuum filler, the operator must ensure that the hopper is sufficiently empty for receiving the contents of a completely filled sausage meat trolley, so that no sausage meat flows over the hopper's edge. To ensure this, one normally waits for a longer time than required. All this in practice leads to unnecessary waiting times and hinders the operating sequence.

Since for ensuring a perfect function, the maximum force of the lifting means (e.g. >3000 N) is always applied, the risk of injury to persons or the risk of damaging objects located in the motion travel of the lifting means increases as e.g. with a half filled sausage meat trolley, the power reserve (e.g. 1500 N) leads to a high risk.

SUMMARY OF THE DISCLOSURE

Starting from this situation, one aspect of the present disclosure is to provide a device and a method for loading a food processing machine which can be operated safely and permits to minimize idle and waiting times.

According to the present disclosure, the device comprises a measuring means for detecting the amount of food in the container. Amount of food here either means the mass or the volume of the food or a corresponding measured value. Thus, the amount of food in the container can be automatically determined. By the determination of the amount of food, a selective process management with reduced idle and waiting times can be realized. The loading operation can be adapted to the respective amount of food. In particular, the speed and the driving power can be optimally adjusted. Overloads can be immediately detected.

In particular, one can e.g. also test whether and when the container is completely emptied after having been tipped into the machine, or whether there are still some food residues in the container. This is done by comparing the measured value with the known empty weight. This information can be correspondingly evaluated, and further measures can be initiated. Moreover, by the determination of the amount of food, one can also determine whether there is already sufficient space, for example in a feed hopper, to receive the corresponding amount of food to prevent it from spilling over.

It is particularly advantageous for the device to comprise a control system which is designed such that the power of the drive of the lifting means is adjusted depending on the detected amount of food. So, the control system generates a control signal for the drive which depends on the measured value or on a signal generated by the measuring means. This means that advantageously no lifting power reserves relevant to safety are provided, so that, if in practice a half-full container is lifted, only half the power must be provided for corresponding food. Since the drive only runs at a correspondingly lower power with smaller amounts of food, a considerable amount of energy costs can be also saved. The danger for a person located in the working range of the lifting means and the risk of damaging objects by collision with the lifting means also decreases.

To detect the amount of food, the measuring means determines, for example, the mass of the food. To this end, e.g. a pair of scales (weight sensor) can be provided in the container or else outside the container, e.g. in the region of a container mounting. In particular, the load can also be determined since the empty weight of the container and e.g. the weight of the arm lifting means are constant. Load detection can be advantageously integrated in the lifting means, in particular in the driving region of the lifting means, and for example be realized via a pressure sensor in a hydraulic system or else via a current meter for the electric drive of the lifting means. For this, a hydraulic lifting means is advantageously provided with a hydraulic pump with an electric drive whose power can be adjusted depending on the amount of food, and where in particular the speed of the lifting means can be adjusted via a throttling means. The measuring means can also comprise a positioning sensor for the container.

Advantageously, the device comprises an apparatus for collision detection which detects a change of the measured value of the measuring means or a deviation from a set value and, depending on the change of the measured value or the deviation, determines whether a collision took place and in particular stops the lifting means and/or drives it back by a certain distance if a collision took place. The measuring means is preferably designed and arranged such that forces generated by collision can be detected. So, a collision during the downward drive of the container would lead to a reduction of the detected measured value for the empty container. A corresponding change of the measured value is evaluated, and if it is determined, for example, that the change of the measured value exceeds a predetermined value during the upward or downward movement of the lifting means, this is evaluated as a collision and one can react correspondingly. This apparatus for collision detection permits the lifting means to independently drive downwards without dead man's control. Since during the downward drive of the container only the empty weight is driven downwards, the power of the drive compared to the filled container is also reduced, and only power required for lowering the empty container is provided, thus contributing to an increased safety. By no more dead man's control being necessary any longer, idle and waiting times can be essentially minimized.

It is particularly advantageous if in the receiving region of the food processing machine, in particular in a feed hopper, at least one level sensor is also provided. Via the level sensor, the food contents in the feed hopper or in the receiving region can be determined. Since the total volume of the receiving region or the hopper is known and is stored in the control system, with the parameters "current filling level in the receiving region", "total volume of the receiving region" and "amount of food in the container", one can automatically determine the ideal point in time for the device to fill in the container's contents into the receiving region. Since the duration required for driving up the container is also known, the movement can begin correspondingly early. By this, unnecessary waiting times can be eliminated. Moreover, the heavy filled container does not unnecessarily long rest in the lifted position, whereby the potential for danger at the working place is further reduced. Either the point in time, e.g. when the state is reached where the contents of the sausage meat trolley fits into the feed hopper, can be indicated by the machine optically, acoustically and/or in another manner, or the control system of the machine automatically initiates the loading operation and thus the start of the lifting movement and/or the start of emptying. So, the container can be anticipatorily driven upwards on the basis of the determined values and then, as soon as the filling level in the receiving region or in the hopper permits it, the contents of the container can be filled in. As an alternative, the optimal point in time for starting the lifting movement can be determined.

The disclosure also permits to design the control system such that the speed of the lifting means can be changed, and in particular certain speed profiles can be adjusted. For example, the container can be lifted and lowered at varying speeds. Since each product comprises different properties (solid or also very liquid sausage meat), for example, the optimal tipping operation for each product can be stored in a corresponding memory. For example, the lifting of the sausage meat trolley can be done slowly (soft start) to prevent, for example, low-viscosity masses from flowing over and out of the sausage meat trolley. Then, the sausage meat trolley can be accelerated to a maximum speed, and shortly before it is tipped, the delay can, for example, be initiated again carefully. It thus becomes possible to optimize the loading operation in time without the mass being spilled from the sausage meat trolley. Consequently, the container can be also completely filled, e.g. in case of low-viscosity products. The downward movement can be initiated manually or automatically with or without dead man's control after the container has been emptied.

The duration for driving up the lifting means to an emptying position can be stored. The point in time at which the container can be emptied can be determined anticipatorily depending on the filling level measured in the feed hopper. The point in time of the start of the lifting movement of the container can then be determined by the control system such that the container can be emptied at the earliest possible point in time, and in particular, the control system can anticipatorily initiate in time the start of the lifting movement such that, when the container is in its emptying position, it can also be emptied immediately.

As an alternative, the container can be driven upwards and the tipping operation can be initiated at a defined event or point in time, e.g. when the contents of the sausage meat trolley fits into the feed hopper.

In particular, after emptying, the measuring means can determine whether the container is completely emptied. For this, e.g. after the emptying of the container, the container weight can be determined and compared to the known empty weight, where, when it is determined that the container is not yet completely empty, that means e.g. that the container weight is still greater by a certain amount than the empty weight, either the tipping operation of the lifting means is extended in time, and/or a new tipping operation is initiated, and/or e.g. a shaking motion is effected by the container driving against a limit stop several times.

BRIEF DESCRIPTION OF THE DRAWINGS

The present disclosure will be illustrated below in greater detail with reference to the present figures.

DETAILED DESCRIPTION OF THE PREFERRED EMBODIMENT

Figure 1:
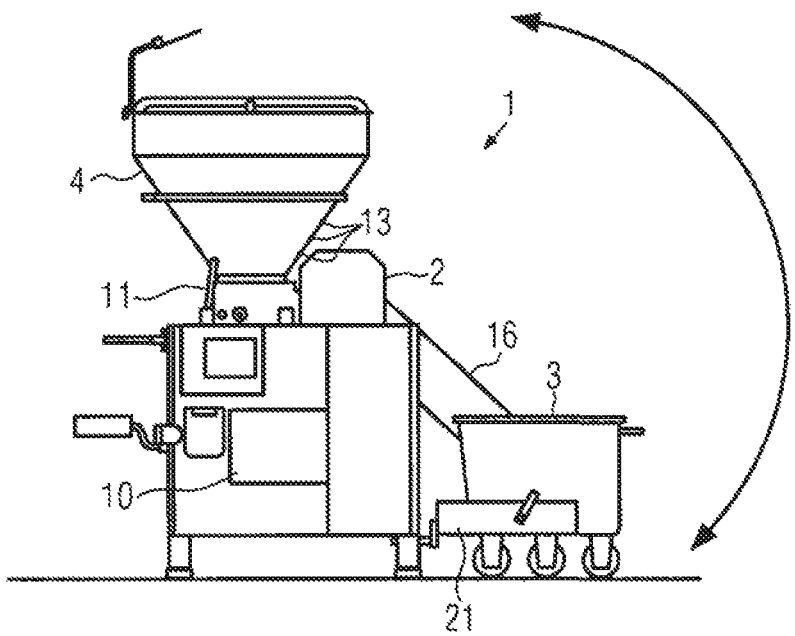
FIG. 1 shows a device according to the present disclosure with a lowered arm lifting means.
Figure 2:
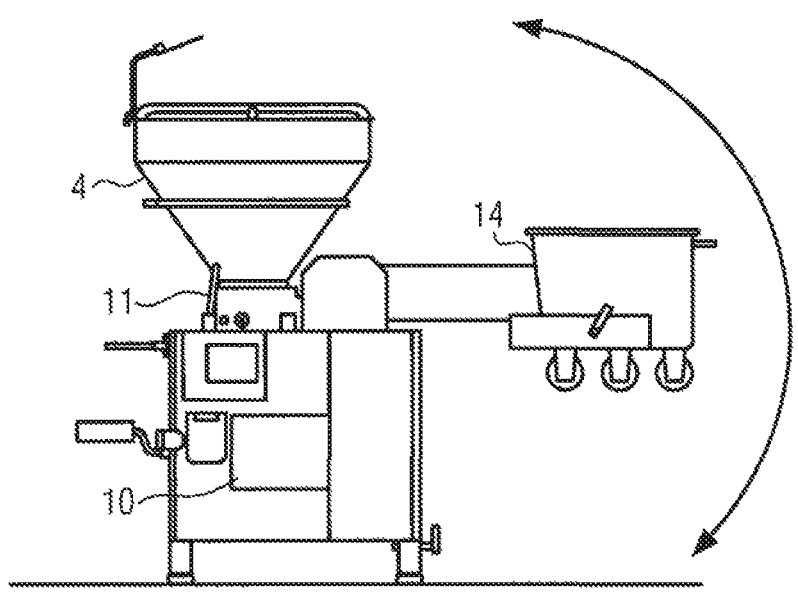
FIG. 2 shows the device shown in FIG. 1 with a half lifted arm lifting means.
Figure 3:
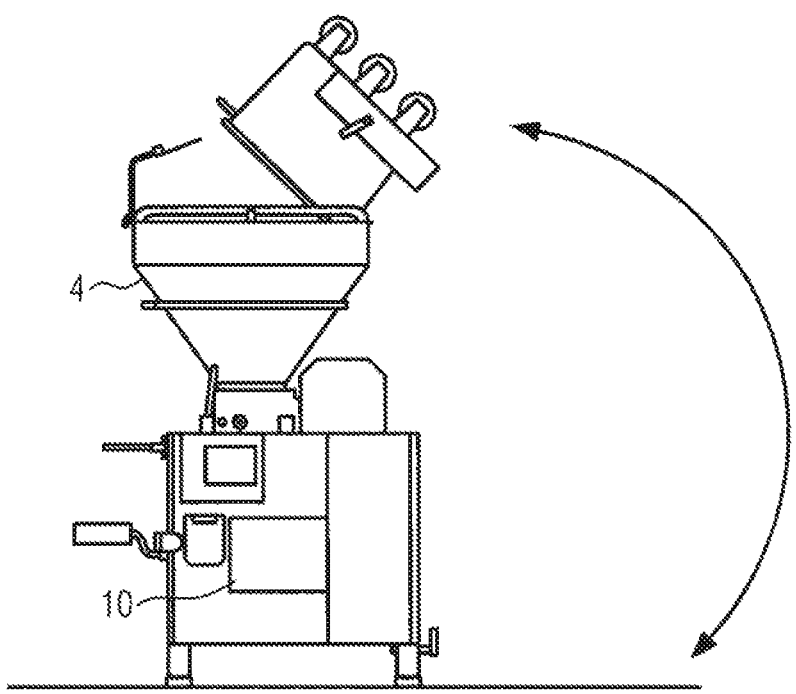
FIG. 3 shows the device shown in FIGS. 1 and 2 with an arm lifting means in an emptying position.

FIGS. 1 to 3 and FIG. 4 show a preferred embodiment for loading a food processing machine with an arm lifting means. However, a pole lifting means is equally suited. In this embodiment, the lifting means 2 is connected to the machine 11, here a filling machine. However, the device could also be designed as an independent unit. The device is equally suited for loading a cutter.

The device comprises a container 3 for receiving food, e.g. sausage meat. The container has a filling volume, for example, within a range of 100 to 1000 liters. Here, the container 3 is embodied as a mobile trolley provided with rollers 5. The container 3 is fixed in a not specially represented receiving unit 21 of the lifting means 2 such that it is securely locked against falling out. This can be done by the container locking into place, for example, in a receiving cage not represented more in detail. A sensor can be provided which detects whether the container 3 is arranged and locked in the mounting. The lifting means 2 can only be further operated when the sausage meat trolley is securely locked.

Figure 4:
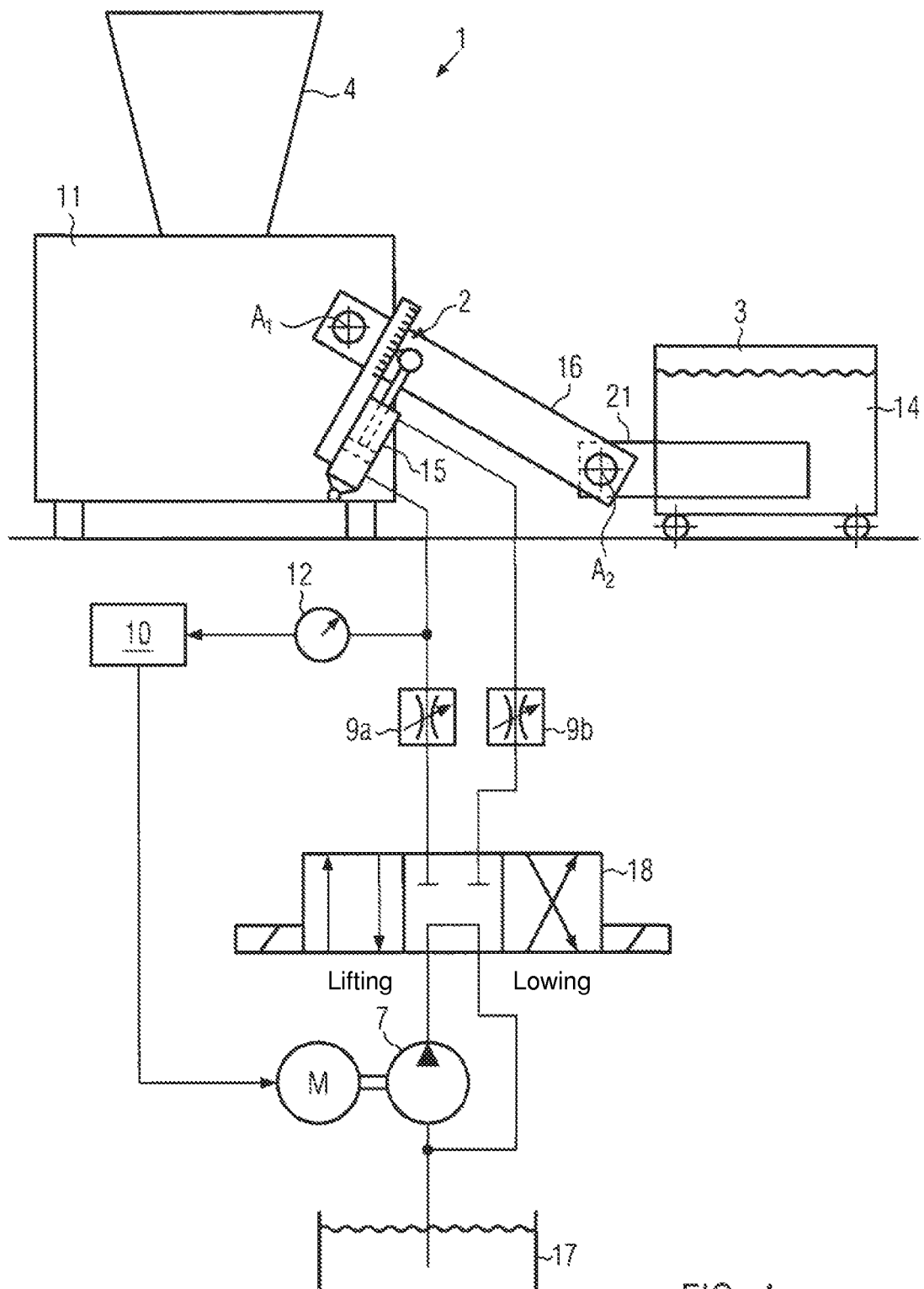
FIG. 4 schematically shows a device according to the present disclosure with a hydraulic lifting means.

As can in particular be taken from FIG. 4, the container 3 is arranged at an arm 16. For emptying the container 3, it can be swiveled, for example, about the axis A2 relative to the arm 16 via a swivel mechanism not illustrated more in detail. The arm 16 is in turn arranged to swivel about the axis A1 for performing a lifting and lowering movement. In the operation of the device, lifting and swiveling motions can also be superposed.

The device furthermore comprises a drive 7. In this embodiment, the lifting means 2 is embodied as a hydraulic lifting means and comprises a hydraulic cylinder 15 by the movement of which the arm 16 can be lifted and lowered via a corresponding mechanism. In a well-known manner, the hydraulic lifting means comprises a hydraulic pump 7 with an electric drive, here the drive motor M, a hydraulic valve 18 for controlling the upward and downward movement, and a container 17 for the hydraulic liquid, here an oil reservoir. In the hydraulic system, a pressure sensor 12 is provided whose function will be illustrated more in detail below and which, for example, transmits its measured values to a control system 10. The drive for the lifting means 2, here the motor for the hydraulic pump 7, is connected to the control system 10 such that the power of the motor is adjusted depending on the contents of the container.

The machine for processing food, here the filling machine 11, comprises a receiving region for the food, here the feed hopper 4. The food is emptied into the feed hopper 4 and further processed.

According to the present disclosure, the device comprises a measuring means for detecting the amount of food in the container 3.

The amount of food can be detected in different ways.

One preferred possibility is to integrate at least one sensor 12 into the driving region of the lifting means 2 by which a value corresponding to the load can be determined. Since the empty weight is constant, the actual load depends on the container's contents.

One possibility is to provide a pressure sensor 12 which measures the pressure in the hydraulic system. As an alternative or in addition, the current of the electric drive, here the motor of the hydraulic pump 7, can be measured. The measurement of current is also suited for an electric lifting means.

Measurement can then be effected, for example, such that the container 3 is fixed and locked in the lifting means 2, and subsequently the power of the motor is increased until lifting is detected via a not represented movement sensor. Then, the lifting force essentially equals the load, and a corresponding measured value S1 can be detected via the pressure sensor 12 or a corresponding intensity of current in the motor M which corresponds to a certain load or a certain amount of food in the container 3. A corresponding signal S1 is directed to the control 10, as can be in particular seen in FIG. 7.

Via the pressure sensor 12 and the current meter in the driving region of the lifting means 2, the container's contents can also be determined as follows. The power of the drive is slowly increased with a predetermined throttle valve position. By this, the pressure in the hydraulic system rises. The pressure is measured by the sensor 12. If the force generated by the hydraulic drive corresponds to the load, the hydraulic cylinder can move and the pressure remains constant and corresponds to the mass in the container 3. The measured value can be transmitted to the control system 10. Measurement can then be continued continuously.

However, it is also possible to determine the contents of the container trolley or the load not, as described above, dynamically, but rather statically. For this, the container is lifted by a height h and then, for example via the pressure sensor or the current meter, the load is determined. This is done e.g. as follows:

The power of the motor M is slowly increased with a predetermined rate of change. The container 3 is lifted up to a predetermined height, e.g. 2 to 5 cm (starting from the lowermost position of the container 3). A not represented positioning sensor can e.g. detect whether the height h is reached. Then, a corresponding measured value S1 is detected, for example, by the pressure sensor 12. The measured value S1 is proportional to the load or to the container's contents and can be evaluated by a control system 10 to correspondingly adjust the power of the lifting means.

For static measurement, it would also be possible, e.g. as described above, to slowly increase the power of the motor M at a predetermined rate of change and to measure the height the container 3 has reached after a predetermined time t. The height reached after the predetermined time t is then proportional to the load or else to the container's contents.

Corresponding to the determined measured values, here, too, a corresponding mass can then be determined in the control system by previously stored comparative values (determined by trial or calculated), and with reference to the density of the container's contents, the volume can also be determined, if required.

The amount of food, however, can also be realized via at least one level sensor 14 in the container 3. A corresponding value can then also be transmitted to the control system 10.

It is also possible that, for example, a weight sensor, for example a pair of scales, is arranged in the container 3 or the container mounting 21. Here, too, a corresponding measured value can be transmitted to the control system 10.

Figure 5:
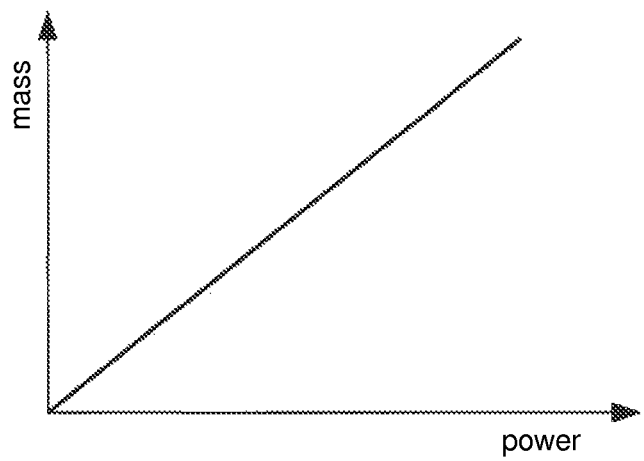
FIG. 5 shows a diagram in which the driving power is represented in response to mass.
Figure 7:
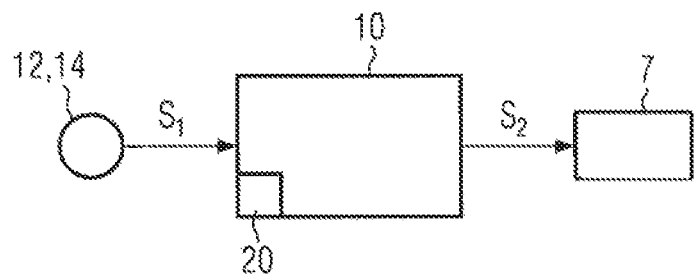
FIG. 7 schematically shows the measuring means, the control system and the drive of the lifting means according to the present disclosure.

So, the control system 10 detects the signal S1 of a measuring means, as can be taken from FIG. 7, the signal S1 depending on the filling amount in the container 3. The control unit 10 transmits a control signal S2 to the drive 7 of the lifting means 2, the signal S2 depending on the signal S1. This means that the power of the drive 7 is controlled depending on the detected amount of food. As can be taken in particular from FIG. 5, the power of the drive 7 increases as the mass m of the food in the container 3 increases.

Here, the power of the drive is designed such that a lifting force is provided which is only slightly higher (e.g. 20-100 N) than the load, so that a reliable lifting and lowering of the container 3 is possible.

This means that the driving power of the lifting means 2 can be automatically adapted to the respective load, so that the lifting means, unlike in prior art, does not always have to be operated at full power. This results in the advantage that no lifting power reserve relevant to safety must be installed. This means that in practice, for a half-full container, only half the power is provided. By this, the danger for persons located in the working range of the lifting means 2 is reduced.

While in pole lifting means, the load is essentially constant, in the arm lifting means, the lifting force to be applied changes due to the arm lever action. Starting from the measured value S1 e.g. determined statically, then e.g. the lifting force can be adapted to the respective position of the container 3 or the arm 6, respectively, corresponding to a predetermined profile or preferably via constant measurement of the hydraulic pressure and speed. This means that the power or the lifting force changes during lifting. Depending on the amount of food in the container, the power profile is then adapted. However, it is also possible to adjust a constant power in the arm lifting means during lifting which is somewhat greater (20-100 N) than the maximally required load.

Advantageously, the device comprises an apparatus for collision detection which is advantageously integrated in the control system 10. The apparatus for collision detection continuously detects, during the upward and downward drive of the lifting means, the measured values S1 for detecting the amount of food, or here the mass or the load. Advantageously, here a dynamic measurement of the load is effected during the moving operation of the lifting means. This dynamic measurement is effected, for example, by measuring the pressure via the sensor 12 or via a measuring means which is arranged outside of the container such that force acting on the container can be detected. So, measurement during lifting and lowering can be effected e.g. also via a weight sensor in the receiving means 21, or by monitoring the flow of current in electric drives.

Figure 6:
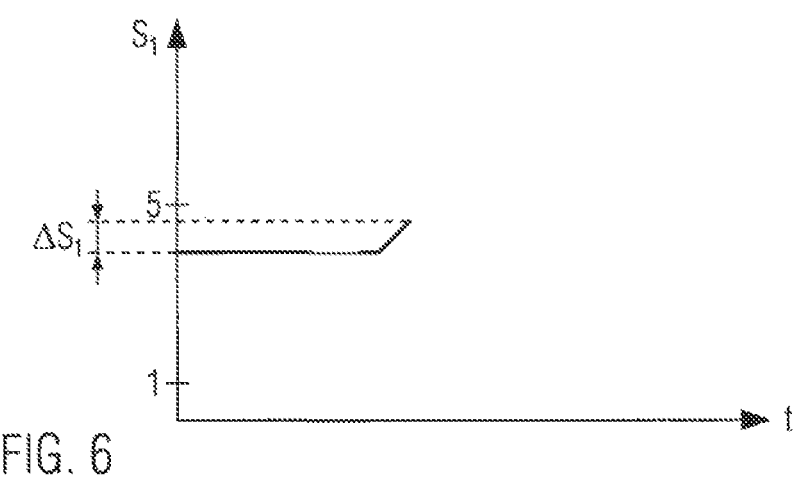
FIG. 6 shows a diagram in which the measured value of the measuring means is represented in response to time.

If now, for example, during the lowering of the lifting means 2, the container 3 hits a person or an object, a force opposed to the load acts to the top, so that the measured value S1 for the empty container changes. As can be taken in particular from FIG. 6, a corresponding change ΔS1 is detected by the collision apparatus 20. For this, a comparator can be provided, only by way of example, which carries out a comparison of following measured values. If the variation of the measured values ΔS1, or the slope of the measured value curve, exceeds a predetermined value, the apparatus for collision detection determines that a collision took place. Via the control system 10, the lifting means 2 can then be immediately shut off and/or driven backwards and optionally emit a corresponding warning signal. The collision detection apparatus 20 determines the collision in the upward and downward movement, not, however, during the emptying of the container 3, since variations ΔS1 here occur due to the emptying.

If, for example, no dynamic measured value detection is effected, but the power of the lifting means or the power profile is determined corresponding to a static measurement, then, as described above, a measured value S can be simultaneously measured by the pressure sensor 12 or by detecting a corresponding intensity of current in the motor M. This measured value then must correspond to a certain set value (corresponding to the constant power or the predetermined power profile). If, as also described above, a deviation ΔS1 of the measured value from the predetermined set value occurs, it is determined that a collision took place.

By the driving power of the lifting means 2 depending on the contents of food in the container 3, i.e. by a reduced force being provided compared to prior art, and by collisions being detected in time, no more dead man's control is required, and an automatic process becomes possible. Thus, idle and waiting times can be effectively minimized.

It is particularly advantageous if also in the receiving region, i.e. in the hopper 4, at least one level sensor is provided. Via this level sensor, the current filling level in the hopper can be detected. Advantageously, in the receiving region 4 or in the feed hopper, respectively, at least one level sensor 13 is provided to determine the filling level of the food in the hopper. The total volume of the receiving region or the hopper 4 is known and stored in the control system. Thus, it can be determined whether there is still sufficient space for the product from the container 3 in the receiving region 4. With the parameters "current filling level in the receiving region 4", "total volume of the receiving region 4", and "amount of food in the container 3", in particular the corresponding volume, then the ideal point in time can be automatically determined to empty the container 3 or to initiate the lifting movement of the lifting means. The volume of the food in the container 3 can be either detected by a level sensor, or it can be calculated by the control system via the mass determined by the measuring means and the corresponding density.

One can obtain the density from a value stored in the machine control system in the program memory, or from the measured values of the current production. For example, with the feeding mechanism of the machine, the current or the total mass flow rate, or the mass flow rate processed within a predetermined time interval, can be detected (e.g. in liters). In addition, the filling level in the hopper is determined by means of a level sensor. Equally, the total weight of the product filled into the feed hopper is known.

The density can also be measured externally and entered into the control system, or the density can be measured and automatically transmitted to the control system, e.g. by means of an RFID tag attached to the container.

Density can also be determined by means of the volume and the mass of the contents in the sausage meat trolley. For this, an additional level sensor 14 is advantageous. Density can also be determined by means of an inline measurement of the air content in the sausage meat, for example as described in EP 1040758.

By the fact that the ideal point in time for the lifting means to fill the sausage meat trolley into the hopper can be determined, unnecessary waiting times can be eliminated. The point in time, e.g. when the state is reached where the contents of the sausage meat trolley fits into the feed hopper, can be either indicated by the machine optically, acoustically and/or in another manner, or the control system of the machine automatically initiates the loading operation and thus the start of the lifting means.

The container can thus also be driven upwards anticipatorily, and as soon as the filling level permits this, the contents can then be filled into the feed hopper. As an alternative, the optimal point in time for starting the lifting means can also be determined.

It is also possible to store varying lifting and/or lowering speeds in the control system, so that idle and waiting times can be further reduced. The lifting means can be semi- or full-automatic with varying speeds. For example, the container can follow certain motion or speed profiles. These profiles can be stored, for example, in the control system (e.g. in the main control unit integrated in the machine or in an external control unit). The speed is controlled by adjusting the throttle valve 9a and/or the throttle valve 9b and/or by the motor speed. Since each product has different properties (solid or also very liquid sausage meat), the optimal tipping operation can be, for example, stored e.g. in a product data memory for each product.

For example, the lifting of the sausage meat trolley can be done slowly (soft start) to prevent an overflow, for example, of low-viscosity masses out of the sausage meat trolley. Then, the sausage meat trolley can be accelerated to a maximum speed, and shortly before it is tipped, the delay can be, for example, initiated again carefully. It thus becomes possible to optimize the loading operation in time without the mass being spilled out of the sausage meat trolley. Consequently, the sausage meat trolley can be completely filled, e.g. with liquid products.

In addition, by the determination of the amount of food before as well as after it has been emptied into the receiving region 4, the total amount provided for the respective vacuum filler can be determined. So, e.g. the total daily production on the corresponding vacuum filling machine, or else the total batch of a type of sausage can be determined. As an alternative or in addition, the provision of food, in particular sausage meat, can be controlled (for example via a host system in the master office) by evaluating the following parameters:

current filler capacity (liters/min),
current filling level in the receiving region 4,
current contents of the container.

Thus, for example the following messages can be output:
Line 1: still 14 minutes to a production stop due to a lack of sausage meat,
Line 2: still 4 minutes to a production stop due to a lack of sausage meat, etc.

Below, a method according to the present disclosure will be illustrated more in detail with reference to FIGS. 1 to 4 in connection with a filling machine. The method, however, is also possible with another food processing machine.

The operator or another person brings a filled container 3, in particular a sausage meat trolley, to the vacuum filling machine 11 and locks the latter securely in the receiving cage 21 of the lifting means 2. Advantageously, a sensor identifies whether there is a trolley in the mounting and whether it is locked (see FIG. 1).

If this is the case, a measuring means 12 detects the amount of food in the container or a corresponding value and transmits a corresponding signal S1 to the control system 10. An overload can be detected in time, e.g. as a result of an inadmissibly loaded sausage meat trolley. Depending on the signal S1, the control system 10 generates a control signal S2 which activates the drive of the lifting means 2 to lift the container (see FIG. 2). Via a level sensor 13, the contents of the feed hopper 4 is determined. As described above, the measuring means 12, 14 for detecting the amount of food determines or calculates the volume of the food in the container 3. The control system then automatically determines the ideal point in time for the lifting means 2 to fill the contents of the sausage meat trolley into the hopper 4. By this, unnecessary waiting times can be eliminated. The point in time when e.g. the state is reached where the contents of the sausage meat trolley fits into the feed hopper can be indicated by the machine optically, acoustically and/or in any other way. With an automatic control of the machine, the control system automatically initiates the loading operation and thus the start of the lifting means and automatically pours the container's contents 3 into the hopper 4 at the right point in time.

The speed at which the lifting means is moved can be adjusted via the throttle valves 9a and/or 9b. Certain speed profiles which are stored in a memory of the control system can also be selected. An apparatus for collision detection continuously detects, during the upward and downward movement, measured values S1 of the measuring means, in particular the sensors in the driving region of the lifting means or else a weight sensor, e.g. in the region of the mounting 21. In case of a collision during the downward movement of the container 3, the measured value changes since a force opposed to the weight occurs. In particular, e.g. the pressure measured in the hydraulic system with the sensor 12 changes.

A weight sensor would also indicate a changed measured value. If the changed measured value exceeds a predetermined amount, the machine automatically stops or drives the lifting means backwards. If a collision occurs during the upward movement, a corresponding change of the measured value also occurs as in addition to the load, another force acts downwards, so that also a collision is detected due to a corresponding change of the measured value. Here, too, the lifting means 2, for example, is stopped. So, if a corresponding unexpected load condition occurs, the lifting means 2 can also be designed such that the movement of the container 3 can nevertheless be performed, however only by means of a dead man's control.

After the container has been emptied into the hopper 4 (FIG. 3), one can check whether the container is completely emptied or whether there are still residues in the container after the container has been tipped by comparing the container weight determined after tipping with the known empty weight which is stored in the memory of the control system 10. This can be done, e.g. as described above, by a weight sensor, or as an alternative simply by determining a change of a measured value ΔS1 of the pressure sensor 12. This information can be correspondingly evaluated, and further measures can be initiated. So, the tipping operation of the lifting means can be extended in time, or another tipping operation is effected, or the trolley can be driven against a limit stop several times (shaking movement).

After the container has been completely emptied, it is lowered by the lifting means, unlocked and removed from the device. Then, the next container 3 can be placed into the device.

The method according to the disclosure allows the machine operator to produce without production interruption as he is relieved by the automated or semi-automated operating sequence. For further automation, the sausage meat trolley can be also automatically unlocked after it has been lowered. In static measurement, for collision monitoring, the pressure is measured in addition by a measuring means, for example continuously by a pressure sensor 12, and e.g. compared to a set pressure value corresponding to the power depending on the amount of food, or here, too, a corresponding change of the measured values is detected, for example to detect a collision or to determine when the container is completely emptied.

The invention claimed is:

1. A device for loading a food processing machine with food, comprising:
   a container for receiving the food,
   a lifting means by which the container can be driven upwards, and a drive for the lifting means, the drive designed such that the power of the drive increases as the mass of the food in the container increases, and
   a measuring means for detecting the amount of food in the container.

2. The device according to claim 1, and the device comprises a control system designed such that the power of the drive is adjusted depending on the detected amount of food.

3. The device according to claim 1, wherein the measuring means detects one of the mass of the food and a value corresponding to a predetermined characteristic of the food.

4. The device according to claim 1, wherein the lifting means comprises a hydraulic lifting means and the drive is a hydraulic pump whose flow rate is adjusted depending on the amount of food.

5. A device for loading a food processing machine with food, comprising:
   a container for receiving the food, a lifting means by which the container is driven upwards, and a drive for the lifting means, a measuring means for detecting the amount of food in the container, designed such that a plurality of measured values ΔS1 of the measuring means are obtained, and means for collision detection which detects one of a change of the measured values ΔS1 of the measuring means and a deviation ΔS1 of a measured value from a set value, and determines, depending on the change of one of the measured values and the deviation ΔS1, whether a collision occurred, and in case of a collision, one of stops the lifting means, or drives the lifting means back by a certain distance, and a combination thereof.

6. The device according to claim 1, and the food processing machine comprises a receiving region which has at least one level sensor.

7. The device according to claim 6, and a control system designed such that, depending on the filling level in the receiving region and the detected amount of food, a selected point in time for emptying the container is determined.

8. A method utilizing a device according to claim 7, and utilizing the control system to vary the speed of the lifting means.

9. A method of loading a food processing machine with food, comprising driving a filled food container upwards by a lifting means having a drive and emptying the container, detecting the amount of food in the container, and changing the power of a drive of the lifting means depending on the detected amount of food, wherein the power of the drive increases as the mass of the food in the container increases.

10. The method according to claim 9, and detecting one of the mass of the food and a value corresponding to a predetermined characteristic of the food.

11. A method of loading a food processing machine with food, comprising:
driving a filled container upwards by a lifting means and emptying the container,
utilizing a measuring means for detecting the amount of food in the container and for obtaining a plurality of measured values ΔS1 of the measuring means, and
detecting one of a change of a measured value ΔS1 of the measuring means and the deviation ΔS1 of a measured value from a set value, and determining, depending on the change of the measured value or the deviation ΔS1, whether a collision took place, wherein one of the lifting means stops, the lifting means drives backwards by a certain distance, and a combination thereof if a collision is determined.

12. The method according to claim 9, and determining the filling level in a receiving region of the food processing machine, and, depending on the filling level in the receiving region and the detected amount of food, determining a selected point in time for emptying the container.

13. The method according to claim 9, further comprising lifting and lowering the container at varying speeds, wherein one of a predetermined movement speed profile is followed, the container is lifted and lowered at varying powers, and a combination thereof, and wherein a certain power profile is followed.

14. A method of loading a food processing machine with food, comprising driving a filled food container upwards by a lifting means and emptying the container, detecting the amount of food in the container, and utilizing a measuring means, wherein after the emptying of the container, the measuring means determines whether the container is completely emptied, and if it was determined that the container is not yet completely emptied, one of the tipping operation of the lifting means is extended in time, a new tipping operation is initiated, a shaking motion is effected by the container driving against a limit stop several times, and a combination thereof.

15. The method according to claim 9, and a control system, and the downward movement of the container is one of automatically initiated by the control system after the container has been completely emptied, and is initiated by an operator with or without dead man's control.

16. The device according to claim 1, wherein the food processing machine is one of a filling machine and a cutter.

17. The device according to claim 3, wherein the predetermined characteristic comprises one of the load and the filling level.

18. The device according to claim 3, wherein the measuring means comprises one of a weight sensor, a pressure sensor, a current meter for the electric drive, a level sensor for the container, a positioning sensor for the container, and a combination thereof.

19. The device according to claim 4, wherein the speed of the lifting means can be adjusted via a throttle means.

20. The device according to claim 6, wherein the receiving region comprises a feed hopper.

21. The method according to claim 13, and adjusting the movement speed profiles of the lifting means.

22. The method according to claim 21, and storing the movement speed profiles in a memory.

23. The method according to claim 10, wherein the predetermined characteristic comprise one of the load, the filling level, and a combination thereof in the container.

24. The method according to claim 15, wherein the power of the downward movement is smaller than or equal to that in the upward movement.

25. A method of loading a food processing machine with food, comprising:
driving a filled container upwards by a lifting means and emptying the container,
detecting the amount of food in the container,
determining a filling level in a receiving region of the food processing machine, and, depending on the filling level in the receiving region and the detected amount of food, determining a selected point in time for emptying the container, and
wherein the duration for the upward drive of the lifting means to an emptying position is stored and a point in time of the beginning of the lifting movement of the container is determined by the control system such that the container can be emptied at the earliest possible point in time.

26. The method according to claim 25, wherein the start of the lifting movement is initiated anticipatorily by the control system such that, when the container is in its emptying position, it can be emptied.

27. A device for loading a food processing machine with food, comprising:
a container for receiving the food,
a lifting means by which the container can be driven upwards, and a drive for the lifting means,
a measuring means for detecting the amount of food in the container,
a means for determining a filling level in a receiving region of the food processing machine, and, depending on the filling level in the receiving region and the detected amount of food, determining a selected point in time for emptying the container,
a means for storing the duration for the upward drive of the lifting means to an emptying position, and a control system for determining a point in time of the beginning of the lifting movement of the container such that the container can be emptied at the earliest possible point in time.

28. A device for loading a food processing machine with food, comprising:
- a container for receiving the food,
- a lifting means by which the container can be driven upwards, and a drive for the lifting means,
- a measuring means for detecting the amount of food in the container, and, after the emptying of the container, for determining whether the container is completely emptied and if determined that the container is not yet completely emptied, for providing one of extending in time the tipping operation of the lifting means, initiating a new tipping operation, effecting a shaking motion by the container driving against a limit stop several times, and a combination thereof.

29. A device for loading a food processing machine with food, comprising:
- a container for receiving the food,
- a lifting means by which the container can be driven upwards, and a drive for the lifting means,
- a measuring means for detecting the amount of food in the container, and
- a control system designed such that the power of the drive is adjusted depending on the detected amount of food, wherein the power of the drive increases as the mass of the food in the container increases.

30. The device according to claim 1, wherein the container is a sausage meat trolley.

31. The method according to claim 9, wherein the container is a sausage meat trolley.

32. The device according to claim 27, wherein the container is a sausage meat trolley.

* * * * *